July 7, 1953  M. W. GUYER ET AL  2,644,676
SLURRY HANDLING DEVICE FOR SEED TREATING MACHINES
Filed May 8, 1951  4 Sheets-Sheet 1
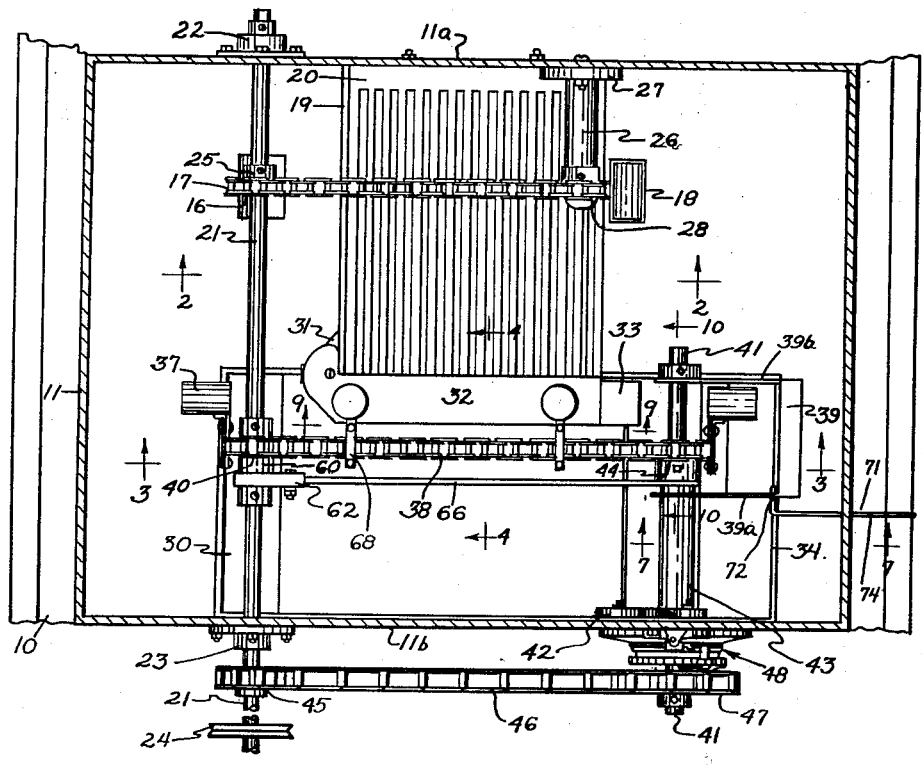
INVENTORS
Morris W. Guyer
Oscar C. Calkins
BY
Atty.

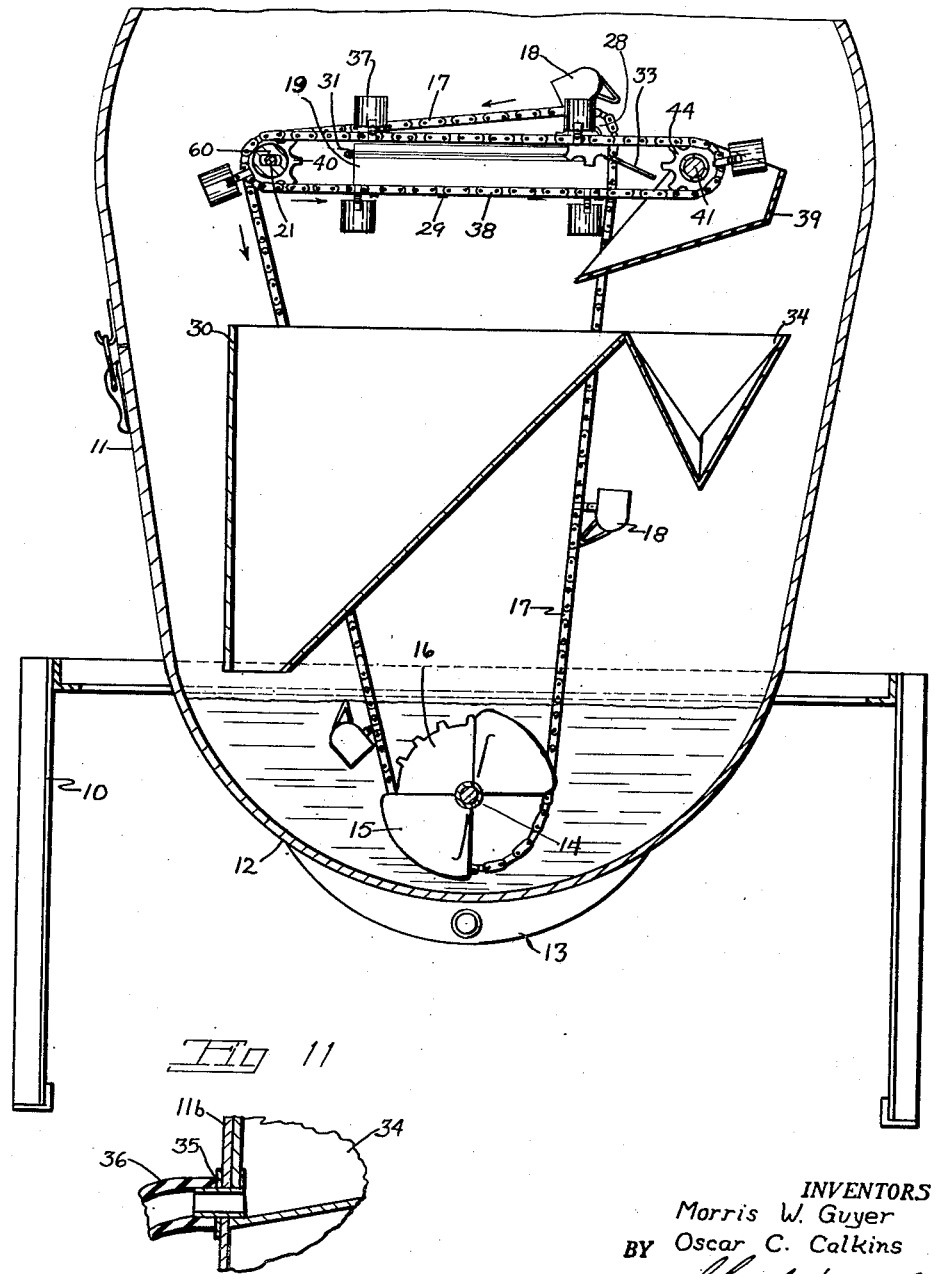

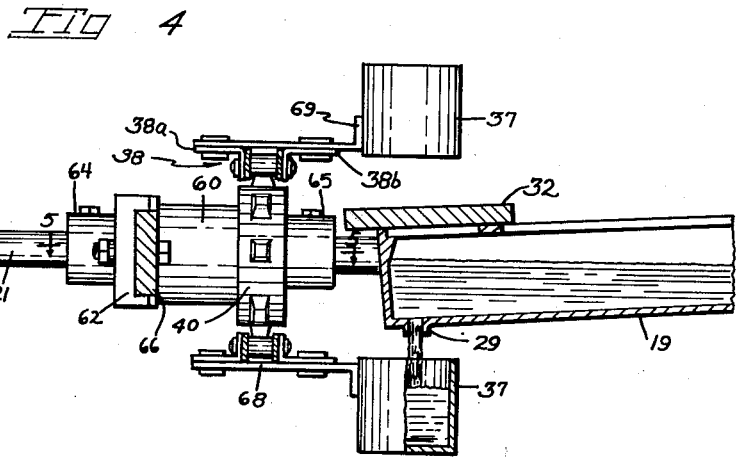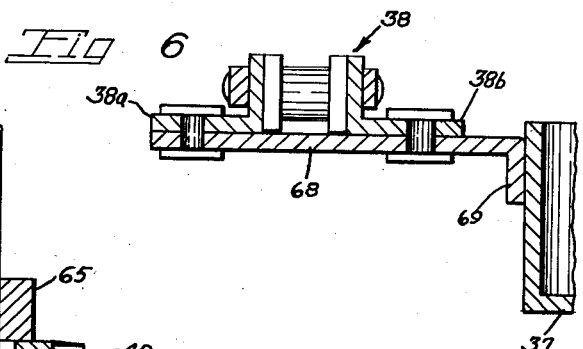

July 7, 1953　　　　M. W. GUYER ET AL　　　　2,644,676
SLURRY HANDLING DEVICE FOR SEED TREATING MACHINES
Filed May 8, 1951　　　　　　　　　　　　4 Sheets-Sheet 4
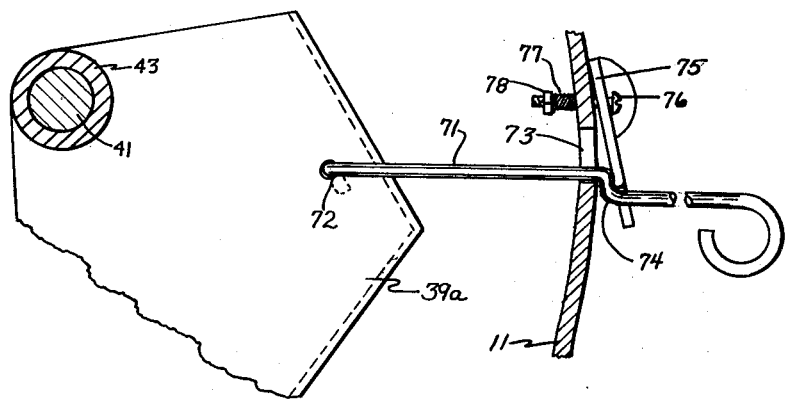
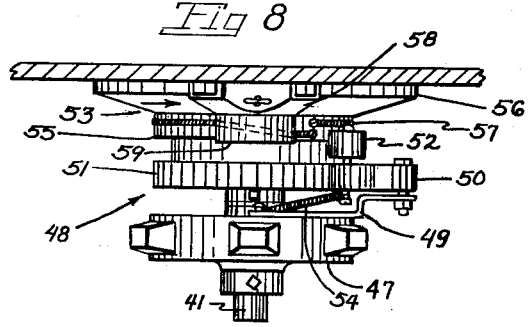
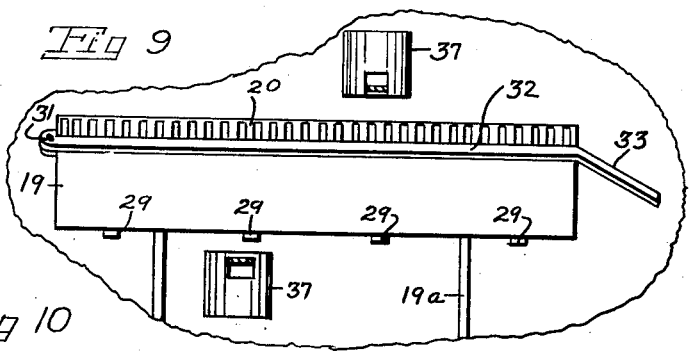
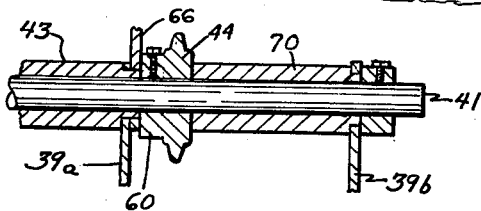
INVENTORS
Morris W. Guyer
BY Oscar C. Calkins
Atty.

Patented July 7, 1953

2,644,676

UNITED STATES PATENT OFFICE 2,644,676

SLURRY HANDLING DEVICE FOR SEED TREATING MACHINES

Morris W. Guyer and Oscar C. Calkins, Spokane, Wash., assignors to Calkins Manufacturing Company, Spokane, Wash.

Application May 8, 1951, Serial No. 225,206

7 Claims. (Cl. 259—45)

Our invention relates to seed treating machines and particularly to a mixing and delivering means for delivering a seed treating slurry in measured quantities to a mixing mechanism where the slurry can be spread on the seeds.

Seed treating chemicals are usually in powder form and in applying them to the seeds it is the custom to make a slurry of liquid and chemicals so that the chemicals which are often quite poisonous can be spread on the seeds without dust and the attendant dangers. The slurry must be agitated continuously in order to keep the finely divided chemical solids uniformly in suspension. In delivering the slurry and measuring it, the measuring cups have to be handled in such a way that the slurry will not settle and deposit on the cups so as to change their measuring capacity.

In the prior application of Claude C. Calkins, Serial No. 152,217, filed March 27, 1950, for Seed Treater, and of common ownership with this application, and the prior application of Morris W. Guyer, Serial No. 787,134, filed November 20, 1947, now Patent No. 2,600,641, dated June 17, 1952, for Seed Treating Machine, seed treating machines are shown which provide means for mixing slurry and delivering it in a continuous stream to fill a measuring cup, the measuring cup being moved from time to time out of the path of the filling stream and emptied. The slurry emptied from the cup is directed into a mixing trough and there distributed on the seeds to be treated.

It is the purpose of the present invention to provide an improved slurry measuring and delivering device by which the slurry is delivered more uniformly and the plurality of slurry measuring cups are filled to overflowing and washed by the slurry and then inverted and drained, the cups being carried on an endless chain so that they are repeatedly passed through the same cycle.

Our invention is embodied in a slurry mixing and delivery attachment for a seed treating machine which embodies a slurry tank having an agitator for mixing the slurry, a bucket elevator for elevating the slurry, an inclined pan directing the elevated slurry to a series of outlets arranged in a row and a plurality of measuring cups carried on a conveyor chain so as to be filled by the slurry from the outlets and then inverted to deliver the slurry into a trough from which it is conveyed to the seeds. The entire mechanism is driven from a single shaft that may be operatively connected to the seed mixing apparatus and the arrangement is such that for a constant drive of the slurry mixer and the elevating mechanism a wide range of adjustment in the amount of slurry delivered is easily obtained.

More particularly it is a purpose of our invention to provide a novel mechanism whereby a plurality of slurry cups are moved step by step across a row of streams of slurry by a conveyor chain, the cups being offset laterally of the chain so that the chain is not in the path of the slurry, together with a receiving trough into which the slurry is dumped from the cups as they are inverted at one end of the conveyor chain.

A further and more particular object of the invention is to provide a slurry tank with means to elevate the slurry and pour it down in a series of streams with a trough beneath the streams to return the slurry into the tank, in combination with a conveyor chain having laterally offset measuring cups secured thereto so as to pass in upright position beneath the streams of slurry and be filled and washed by the slurry and then to be up-ended at a position laterally of the streams of slurry into a receiving trough, and a manually operable deflector positioned to return the slurry emptied from the measuring cups to the tank at the will of the operator.

The nature and advantages of our invention will appear more fully from the following description and the accompanying drawings. It should be understood however, that the drawings and description are illustrative only and are not to be considered as limiting the invention except insofar as it is limited by the claims.

In the drawings:

Figure 1 is a plan view with the housing in section of a slurry mixing and delivering device embodying our invention;

Figure 2 is a fragmentary sectional view taken on the line 2—2 of Figure 1;

Figure 3 is a sectional view taken on the line 3—3 of Figure 1;

Figure 4 is an enlarged fragmentary sectional view taken on the line 4—4 of Figure 1;

Figure 5 is an enlarged fragmentary sectional view taken on the line 5—5 of Figure 4 with the chain removed;

Figure 6 is a fragmentary sectional view taken transversely of a slurry cup chain showing the manner in which a slurry cup is attached thereto;

Figure 7 is an enlarged fragmentary sectional view taken on the line 7—7 of Figure 1;

Figure 8 is an enlarged plan view of the mechanism employed to regulate the rate of travel of the slurry measuring cups;

Figure 9 is a fragmentary sectional view taken on the line 9—9 of Figure 1 illustrating the lower end of the slurry pan;

Figure 10 is a fragmentary sectional view taken on the line 10—10 of Figure 1; and Figure 11 is a sectional view illustrating the outlet for the measured slurry.

Referring now in detail to the drawings, the invention is embodied in a slurry mixing and measuring attachment which is supported by a frame 10. A housing 11 has a rounded bottom 12 with a small well 13 disposed centrally thereof. In the lower portion of the housing there is an agitator shaft 14 having an agitator 15 thereon for maintaining the slurry in motion. The shaft 14 has a sprocket wheel 16 thereon by which the shaft is driven. A sprocket chain 17 drives the sprocket wheel 16 and serves also to support elevator buckets 18 for elevating slurry from the well 13. The buckets 18 dump the slurry into a pan 19 which is mounted on the wall 11a of the housing. The pan 19 has a grate 20 covering it through which the slurry flows when it is dumped from the buckets 18.

The motive power for driving the sprocket chain 17 is obtained from a shaft 21 that is mounted in bearings 22 and 23 in the ends of the housing and projects beyond the end 11b of the housing for connection to any suitable drive means such as a pulley 24 that may be driven from the said mixing device with which this attachment is used. A sprocket wheel 25 is fixed on the shaft 21 and engages the sprocket chain 17. A stub shaft 26 is mounted on the wall 11a by a bracket 27 and has a sprocket wheel 28 (see Figure 2) to guide the sprocket chain 17 over the top of the pan 19. The pan 19 is inclined downwardly away from the wall 11a so that the slurry emptied into the pan by the buckets 18 will flow away from the wall 11a to the lower end of the pan. Braces 19a on the wall 11a serve to provide additional support for the pan 19.

The lower end of the pan 19 is provided with a row of outlet openings 29 (see Figure 9) for the discharge of the slurry from the pan. A trough 30 is spaced below the pan 19 in position to intercept the slurry flowing through the outlet openings 29 and direct it downwardly into the lower portion of the housing 11 at one side of the rounded bottom portion 12. As long as the shaft 21 is driven the slurry will be agitated and carried up into the pan 19 to maintain a flow of slurry through the outlets 29. The pan 19 has an ear 31 at one side edge on which a cover plate 32 is secured. This cover plate extends across the top of the lower end of the pan 19 and has an inclined lip 33 projecting beyond the pan as illustrated in Figures 1 and 9.

A receiving trough 34 is offset laterally from the lower end of the pan 19 and spaced below the level of the lower end of the pan. This receiving trough is mounted on the wall 11b of the housing 11 and has a drain outlet 35 extending through the wall for connection to a hose 36. See Figure 11 for the details of this drain outlet.

In order to deliver measured quantities of slurry from the outlets 29 of the pan 19 into the receiving trough 34, we provide a plurality of measuring cups 37 on a conveyor chain 38. The conveyor chain 38 has its lower flight below the level of the pan 19 and its upper flight above the level of the pan 19. In addition the connection of the cups 37 to the conveyor chain is such that the cups 37 are laterally offset with respect to the conveyor chain so that their path of travel is around the lower end of the pan 19. The cups pass directly beneath the outlets 29 as they are carried along the lower flight of the chain 38 and the cups are upright in this position. They are then inverted as they pass from the lower flight to the upper flight of the conveyor at the right hand end of Figure 3, and as they travel along the upper flight of the conveyor they are directly over the cover plate 32 so that any drainage from the cups is down upon the cover plate 32.

It will be noted from the drawings that the receptacle 34 is positioned directly beneath that portion of the chain 38 where the cups 37 are inverted. The slurry is poured out of the cups as they are inverted and normally passes into the receptacle 34. A deflector scoop 39 is provided for preventing the slurry emptied from the cups 37 from falling into the receptacle 34. This deflector scoop is manually controllable in a manner which will later be described so as to direct the flow of slurry from the cups into the trough 30 or into the receptacle 34.

The conveyor chain 38 is supported at one end by a sprocket wheel 40 that is supported by the shaft 21. This however, is not the drive sprocket for the sprocket chain 38. A shaft 41 is supported by a bracket 42 on the wall 11b and a bearing sleeve 43 that is integral with the bracket 32. This shaft 41 has a sprocket wheel 44 fixed thereto for driving the chain 38. The shaft 41 also rotatably supports the deflector scoop 39 in a manner which will be presently explained.

The shaft 41 is driven from the shaft 21 by a sprocket wheel 45 fixed on the shaft 21, a sprocket chain 46, a sprocket wheel 47 rotatable on the shaft 41 and an adjustable pawl and ratchet mechanism 48. This pawl and ratchet mechanism is shown somewhat in detail in Figure 8 and includes means whereby each rotation of the sprocket wheel 47 will effect a partial rotation of the shaft 41. The amount of movement given to the shaft 41 for each rotation of the sprocket wheel 47 can be adjusted by the mechanism 48 over a wide range so as to control the amount of slurry which will be poured from the cups 37 into the receptacle 34.

In detail the mechanism 48 comprises a pawl supporting arm 49 on the sprocket wheel 47, a pawl 50 on the arm 49, a ratchet wheel 51 non-rotatably connected to the shaft 41, a roller 52 on the pawl 50 and an adjustable roller guide means 53 for limiting the amount of each rotation that the pawl 50 will be permitted to engage the ratchet wheel 51. A spring 54 yieldingly urges the pawl 50 toward the ratchet wheel 51. The roller 52 rides on a circular flange 55 of a plate 56 that rests against the wall 11b of the housing and can be rotated about the shaft 41. A closely coiled spring 57 is wound about the flange 55 with the two ends of the spring secured to the flange at about the same point in its circumference. One end of the spring however, is positioned where it will be engaged by the roller 52 and the other end is spaced from the roller 52. On the wall 11a a deflector block 58 is mounted. This block has a rounded portion 59 that overlies the flange 55 and has a groove on the inner face thereof for the spring 57. This groove extends downwardly across the portion 59 so that if the plate 56 is turned in the direction of the arrow, the spring 57 will be shifted on the flange 55 as it passes through the groove into position to engage the roller 52 and thus lift the pawl 50 out of contact with the ratchet 51. It is believed to be evident from the foregoing description that the raised portion 59 of the member 58 determines the least amount of a rotation of the sprocket wheel 47 during which the pawl 50 can be held out of contact with the ratchet wheel 51. The plate 56 can be turned to cause practically the entire length of the spring 57 to be moved into the path of the roller 52 so as to prevent the pawl 50 from engaging the ratchet wheel 51.

While we have gone into considerable detail to explain the operation of the mechanism 48, no claim is made herein to the mechanism per se and it will be readily apparent that other suitable mechanisms may be used between the shafts 21 and 41 for controlling the relative amounts of rotation thereof.

The particular mounting of the sprocket wheel 40 on the shaft 21 provides for adjustment of the spacing between the sprocket wheel 40 and 44 so as to tighten the sprocket chain 38. See Figure 5 of the drawings. The sprocket wheel 40 has a hub 60 which is rotatably mounted on a laterally projecting sleeve 61 of a mounting head 62. The sleeve 61 and the head 62 have an oblong slot 63 through which the shaft 21 passes. Collars 64 and 65 fastened to the shaft 21 by set screws, keep the sprocket wheel 40 and the head 62 in position lengthwise of the shaft 21. A bar 66 extends from the head 62 to the bearing sleeve 43 for the shaft 41 and is mounted on this bearing sleeve adjacent to the sprocket wheel 44 as illustrated in Figures 1 and 10. The bar 66 is bolted to the head 62 and an elongated slot 67 in the head 62 provides the necessary adjustment for moving the sprocket wheel 40 with respect to the sprocket wheel 44 to keep the chain 38 tight.

The particular mounting means employed for mounting the cups 37 on the chain 38 is illustrated best by Figures 4 and 6. On certain links of the chain 38, we provide flanges 38a and 38b. A strap 68 is riveted to these flanges and is welded to the side of the cup 38 as indicated at 69. The length of the strap 68 is just sufficient to offset the cups 37 so that they will pass under the outlets 29 and over the cover plate 32 at the lower end of the pan 19. The loads of the cups 37 are so slight that they do not twist the chain 38 appreciably so the cups are substantially level as they pass under the outlets 29.

Figures 7 and 10 illustrate the details of mounting and operation of the deflector scoop 39. As illustrated best in Figure 10, this scoop is pivoted by its side flanges 39a and 39b on the bearing sleeve 43 and a spacer sleeve 70 on the shaft 41. A rod 71 has one end 72 secured in the side flange 39a of the scoop 39. This rod passes through an aperture 73 in the side wall of the housing 11 and has an offset at 74 that will engage the outer surface of the wall when the rod is drawn back as illustrated in Figure 7. A spring pressed clip 75 is secured by a screw 76, a spring 77 and a nut 78 to the wall of the housing so that it can be moved into position to hold the offset 74 down as shown in Figure 7. In this position the scoop 39 is pulled back so that it does not deflect the slurry discharge from the cups away from the receptacle 34. When the slurry is to be deflected back into the trough 30, the clip 75 is lifted and the rod 71 is shoved inward so as to allow the scoop 39 to take the position illustrated in Figure 3 which is its natural position because of its center of gravity.

Having described our invention, we claim:

1. In a seed treating machine, an inclined slurry pan, means to maintain a supply of slurry in said pan, a plurality of outlets arranged in a row adjacent the lower edge of said pan, an endless flexible conveyor adjacent the lower edge of said pan, said conveyor having a plurality of spaced apart measuring cups secured thereto and offset laterally therefrom, said cups being in the same vertical plane as said outlets, the lower flight of the conveyor being below the lower edge of the pan and the cups on said lower flight having their open ends up, means to drive said conveyor, and a receiving trough beneath one end of said conveyor, and offset lengthwise of the conveyor from the nearest outlet from the pan.

2. In a seed treating machine, an inclined slurry pan, means to maintain a supply of slurry in said pan, a plurality of outlets arranged in a row adjacent the lower edge of said pan, an endless flexible conveyor adjacent the lower edge of said pan, said conveyor having a plurality of spaced apart measuring cups secured thereto and offset laterally therefrom, said cups being in the same vertical plane as said outlets, the lower flight of the conveyor being below the lower edge of the pan and the cups on said lower flight having their open ends up, means to drive said conveyor, a receiving trough beneath one end of said conveyor, and offset lengthwise of the conveyor from the nearest outlet from the pan, and an intercepting scoop movable into and out of position to deflect slurry from the cups away from the trough.

3. In combination, a slurry tank, a slurry agitator therein, a shaft for said agitator, a drive sprocket wheel on said shaft, a bucket conveyor chain driving said sprocket wheel, and extending upwardly in said tank, spaced apart supports above the sprocket wheel over which supports the bucket conveyor chain passes, an inclined pan between said supports, positioned to receive slurry elevated by said bucket conveyor, said pan having a row of outlets adjacent to its lower edge, an endless conveyor extending parallel to said row of outlets, measuring cups secured to said conveyor, the cups being carried upright by the lower flight of said conveyor horizontally beneath the row of outlets, and being carried inverted over the lower portion of the pan by the upper flight of said conveyor, a receiving trough below the end of the conveyor where the cups rise from the lower flight to the upper flight of said conveyor, said trough being positioned to receive slurry from said cups as they are inverted in passing from the lower flight to the upper flight of said conveyor.

4. In combination, a slurry tank, a slurry agitator therein, a shaft for said agitator, a drive sprocket wheel on said shaft, a bucket conveyor chain driving said sprocket wheel, and extending upwardly in said tank, spaced apart supports above the sprocket wheel over which supports the bucket conveyor chain passes, one of said supports comprising a drive shaft for said bucket conveyor, an inclined pan between said supports, positioned to receive slurry elevated by said bucket conveyor, said pan having a row of outlets adjacent to its lower edge, an endless conveyor extending parallel to said row of outlets, means driven by said drive shaft intermittently advancing said endless conveyor, measuring cups secured to said conveyor, the cups being carried upright by the lower flight of said conveyor horizontally beneath the row of outlets, and being carried inverted over the lower portion of the pan by the upper flight of said conveyor, a receiving trough below the end of the conveyor where the cups rise from the lower flight to the upper flight of said conveyor, said trough being positioned to receive slurry from said cups as they are inverted in passing from the lower flight to the upper flight of said conveyor.

5. In a seed treating machine, a slurry container, means for delivering a stream of slurry from said container, an endless conveyor having a portion running laterally adjacent to the means for delivering the stream of slurry, said conveyor having a series of measuring cups affixed thereto to pass beneath said delivery means with their open ends up, a receiving trough spaced endwise of the conveyor from the delivery means and beneath the path of the cups affixed to the conveyor, means cooperating with the conveyor for inverting the cups while they are carried over the receiving trough by the conveyor, an intercepting scoop suspended between the conveyor and the trough, and means to move said scoop into and out of position to deflect the slurry pouring out of the cups, as they are inverted, away from the trough.

6. In a seed treating machine, a slurry container, an outlet in the bottom of the container for delivering a stream of slurry from said container, an endless conveyor having a portion running laterally adjacent to the outlet, said conveyor having a series of measuring cups affixed thereto to pass beneath said outlet with their open ends up, a receiving trough spaced endwise of the conveyor from the outlet and beneath the path of the cups affixed to the conveyor, a drive member for said conveyor over the receiving trough, around which the conveyor travels, to invert the cups over said trough, a shaft for said drive member, an intercepting scoop suspended on said shaft over the receiving trough and means to move said scoop into and out of position to deflect slurry away from said trough.

7. In a seed treating machine, an inclined slurry pan and means to maintain a supply of slurry in said pan, said pan having a row of outlets adjacent to its lower edge, an endless conveyor extending parallel to said row of outlets, measuring cups secured to said conveyor, the cups being carried upright by the lower flight of said conveyor horizontally beneath the row of outlets, said cups being carried inverted over the slurry pan by the upper flight of said conveyor, a cover plate over that portion of the slurry pan traversed by the inverted cups, and a receiving trough below that end of the conveyor where the cups rise from the lower flight to the upper flight of said conveyor, said trough being positioned to receive the slurry emptied from said cups as they are inverted.

MORRIS W. GUYER.
OSCAR C. CALKINS.

References Cited in the file of this patent

UNITED STATES PATENTS

| Number | Name | Date |
|---|---|---|
| 2,141,044 | Rassmann | Dec. 20, 1938 |
| 2,295,258 | Cann | Sept. 8, 1942 |
| 2,507,290 | Wright et al. | May 9, 1950 |